US010680539B2

(12) United States Patent
Okamoto (10) Patent No.: US 10,680,539 B2
(45) Date of Patent: Jun. 9, 2020

(54) VARIABLE-SPEED SPEED INCREASER (71) Applicant: MITSUBISHI HEAVY INDUSTRIES COMPRESSOR CORPORATION, Tokyo (JP)

(72) Inventor: Yoshiyuki Okamoto, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/078,944

(22) PCT Filed: Feb. 26, 2016

(86) PCT No.: PCT/JP2016/055773
§ 371 (c)(1),
(2) Date: Aug. 22, 2018

(87) PCT Pub. No.: WO2017/145350
PCT Pub. Date: Aug. 31, 2017

(65) Prior Publication Data
US 2019/0068090 A1 Feb. 28, 2019

(51) Int. Cl.
*F16H 3/72* (2006.01)
*H02K 9/06* (2006.01)
(Continued)

(52) U.S. Cl.
CPC ............ *H02P 5/747* (2013.01); *F04D 25/028* (2013.01); *F04D 25/06* (2013.01); *F04D 25/082* (2013.01);
(Continued)

(58) Field of Classification Search
CPC ............ F16H 3/724; F16H 3/725; H02K 9/06
See application file for complete search history.

(56) References Cited

U.S. PATENT DOCUMENTS 4,043,227 A * 8/1977 Beals ................... F16H 47/04
477/69
4,111,073 A * 9/1978 Chana ................... F16H 47/04
477/41
(Continued)

FOREIGN PATENT DOCUMENTS

DE    3312663 A1 * 10/1984  ............... F16H 3/72
FR    2194064 A1 *  2/1974  ............. H02K 7/116
(Continued)

OTHER PUBLICATIONS

International Search Report for corresponding International Application No. PCT/JP2016/055773, dated Mar. 22, 2016 (4 pages).
(Continued)

*Primary Examiner* — Tisha D Lewis
(74) *Attorney, Agent, or Firm* — Osha Liang LLP (57) ABSTRACT

A variable-speed speed increaser includes: an electric driving device which is configured to generate a rotational driving force; and a transmission device which is configured to change the speed of the rotational driving force generated by the electric driving device and transmit the changed rotation driving force to a driving target. The transmission device includes: a sun gear which is configured to rotate about an axis; a sun gear shaft which is fixed to the sun gear and extends in an axial direction around the axis; a planetary gear which is configured to mesh with the sun gear, revolve around the axis and rotate about a center line of the planetary gear; an internal gear which includes a plurality of teeth aligned annularly around the axis and is configured to mesh with the planetary gear; a planetary gear carrier; and an internal gear carrier.

6 Claims, 6 Drawing Sheets

(51) Int. Cl.
*H02P 5/747* (2006.01)
*F16D 57/02* (2006.01)
*F04D 25/16* (2006.01)
*F04D 29/58* (2006.01)
*F04D 25/02* (2006.01)
*F04D 25/06* (2006.01)
*F04D 25/08* (2006.01)
*H02K 7/116* (2006.01)
*H02P 5/753* (2006.01)

(52) U.S. Cl.
CPC ......... *F04D 25/16* (2013.01); *F04D 29/5806* (2013.01); *F16D 57/02* (2013.01); *F16H 3/72* (2013.01); *H02K 7/116* (2013.01); *H02K 9/06* (2013.01); *F05B 2260/40311* (2013.01); *F16H 3/728* (2013.01); *H02P 5/753* (2013.01)

(56) References Cited

U.S. PATENT DOCUMENTS

| | | | |
|---|---|---|---|
| 4,514,991 A | 5/1985 | Zinsmeyer | |
| 10,197,063 B2 * | 2/2019 | Nakaniwa | F04D 17/12 |
| 10,294,949 B2 * | 5/2019 | Bergamini | F04D 17/122 |
| 2005/0113201 A1 | 5/2005 | Kimura et al. | |
| 2017/0170755 A1 * | 6/2017 | Okamoto | H02K 7/116 |

FOREIGN PATENT DOCUMENTS

| | | | |
|---|---|---|---|
| JP | S60-087698 A | 5/1985 | |
| JP | H07-079592 A | 3/1995 | |
| JP | H08-308178 A | 11/1996 | |
| JP | H09-327161 A | 12/1997 | |
| JP | 2002-078282 A | 3/2002 | |
| JP | 2006-296107 A | 10/2006 | |
| JP | 4472350 B2 | 6/2010 | |
| WO | 03/007116 A2 | 1/2003 | |
| WO | WO-2014148274 A1 * | 9/2014 | F04D 17/12 |

OTHER PUBLICATIONS

Written Opinion for corresponding International Application No. PCT/JP2016/055773, dated Mar. 22, 2016 (11 pages).

* cited by examiner

AXIAL DIRECTION
INPUT SIDE ◄——► OUTPUT SIDE

VARIABLE-SPEED SPEED INCREASER

TECHNICAL FIELD

The present invention relates to a variable-speed speed increaser which includes an electric driving device including a constant-speed motor and a variable-speed motor, and a planetary gear transmission device configured to change the speed of a rotational driving force generated by the electric driving device and then transmit the speed-changed rotational driving force to a driving target.

BACKGROUND OF THE INVENTION

As an apparatus configured to drive a rotary machine such as a compressor, there is an apparatus including an electric driving device configured to generate a rotational driving force and a transmission device configured to change the speed of the rotational driving force generated by the electric driving device and then transmit the speed-changed rotational driving force to the rotary machine.

Patent Document 1 discloses an apparatus including: a constant-speed motor and a variable-speed motor for speed change as an electric driving device; and a planetary gear transmission device as a transmission device. The apparatus makes it possible to change the rotation rate of the variable-speed motor to change the rotation rate of the output shaft of the transmission device connected to a rotary machine.

DOCUMENTS OF RELATED ART

Patent Documents

Patent Document 1
  Japanese Patent Publication No. 4472350

SUMMARY OF THE INVENTION

Problems to be Solved by the Invention

In the above-mentioned apparatus, when the apparatus is intended to be urgently stopped, the power supply is cut off, and thereby the rotation rate of the constant-speed motor and the rotary machine which is a driving target is spontaneously reduced. On the other hand, there is a case where the rotation rate of the variable-speed motor is determined by the rotation rate of the constant-speed motor or the inertia of the rotary machine. Thus, there is a problem that the rotation rate of the variable-speed motor becomes larger than a rated rotation rate.

The present invention aims to provide a variable-speed speed increaser which includes: an electric driving device including a constant-speed motor and a variable-speed motor; and a planetary gear transmission device configured to change the speed of a rotational driving force generated by the electric driving device and then transmit the speed-changed rotational driving force to a driving target, wherein the rotation rate of the variable-speed motor can be prevented from becoming excessive when the apparatus is urgently stopped.

Means to Solve the Problems

A variable-speed speed increaser according to the first aspect of the present invention includes: an electric driving device configured to generate a rotational driving force; and a transmission device configured to change the speed of the rotational driving force generated by the electric driving device and transmit the changed rotation driving force to a driving target, wherein the transmission device includes: a sun gear which is configured to rotate about an axis; a sun gear shaft which is fixed to the sun gear and extends in an axial direction around the axis; a planetary gear which is configured to mesh with the sun gear, revolve around the axis and rotate about its own center line; an internal gear which has a plurality of teeth aligned annularly around the axis and is configured to mesh with the planetary gear; a planetary gear carrier which has a planetary gear carrier shaft extending in the axial direction around the axis and is configured to support the planetary gear to allow the planetary gear to revolve around the axis and to rotate about a center line of the planetary gear itself; and an internal gear carrier which has an internal gear carrier shaft extending in the axial direction around the axis and is configured to support the internal gear to allow the internal gear to be rotatable about the axis, wherein the sun gear shaft forms an output shaft connected to the driving target, the internal gear carrier shaft forms a constant-speed input shaft, and the planetary gear carrier shaft forms a variable-speed input shaft, and the electric driving device includes: a variable-speed motor having a variable-speed rotor which is connected to the variable-speed input shaft of the transmission device and formed in a cylindrical shape centered on the axis with a shaft insertion hole passing therethrough in the axial direction; a constant-speed motor having a constant-speed rotor which is connected to the constant-speed input shaft of the transmission device and inserted through the shaft insertion hole; and an impeller which is installed on the variable-speed rotor and causes windage loss by rotation of the variable-speed rotor.

According to such a constitution, when the variable-speed speed increaser is urgently stopped, the impeller becomes resistance against the rotation of the variable-speed rotor. Accordingly, it is possible to prevent the variable-speed motor from over-rotating.

In the variable-speed speed increaser, the variable-speed motor may have a variable-speed motor casing which is configured to rotatably support the variable-speed rotor, and the impeller may be disposed inside the variable-speed motor casing.

According to such a constitution, during the operation of the variable-speed speed increaser, the inside of the variable-speed motor can be cooled using the impeller.

In the variable-speed speed increaser, a gas supply device which is configured to introduce a gas into an internal space of the variable-speed motor casing may be provided.

According to such a constitution, windage loss due to the impeller can be increased by introducing a gas into the internal space of the variable-speed motor casing when the variable-speed motor is urgently stopped and thereby increasing the pressure in the internal space.

In the variable-speed speed increaser, a blower provided at the same position as that of a conductive body of the variable-speed motor in the axial direction and oriented so that generated wind is directed in the radial direction of the variable-speed rotor may be provided, the impeller may include a first impeller provided on one side of the conductive body in the axial direction and a second impeller provided on the other side of the conductive body, and the first impeller and the second impeller may be formed so that directions of generated wind are opposite to each other in the axial direction.

According to such a constitution, it is possible to reduce the windage loss due to the impeller during the operation of the variable-speed speed increaser by operating the blower to reduce the windage loss caused by the impeller during the operation of the variable-speed speed increaser.

Effects of the Invention

According to the present invention, when the variable-speed speed increaser is urgently stopped, the impeller is a resistance against the rotation of the variable-speed rotor. Accordingly, it is possible to prevent the variable-speed motor from over-rotating.

EMBODIMENTS FOR CARRYING OUT THE INVENTION

Hereinafter, a variable-speed speed increaser according to an embodiment of the present invention will be described in detail with reference to the drawings.

Figure 1:
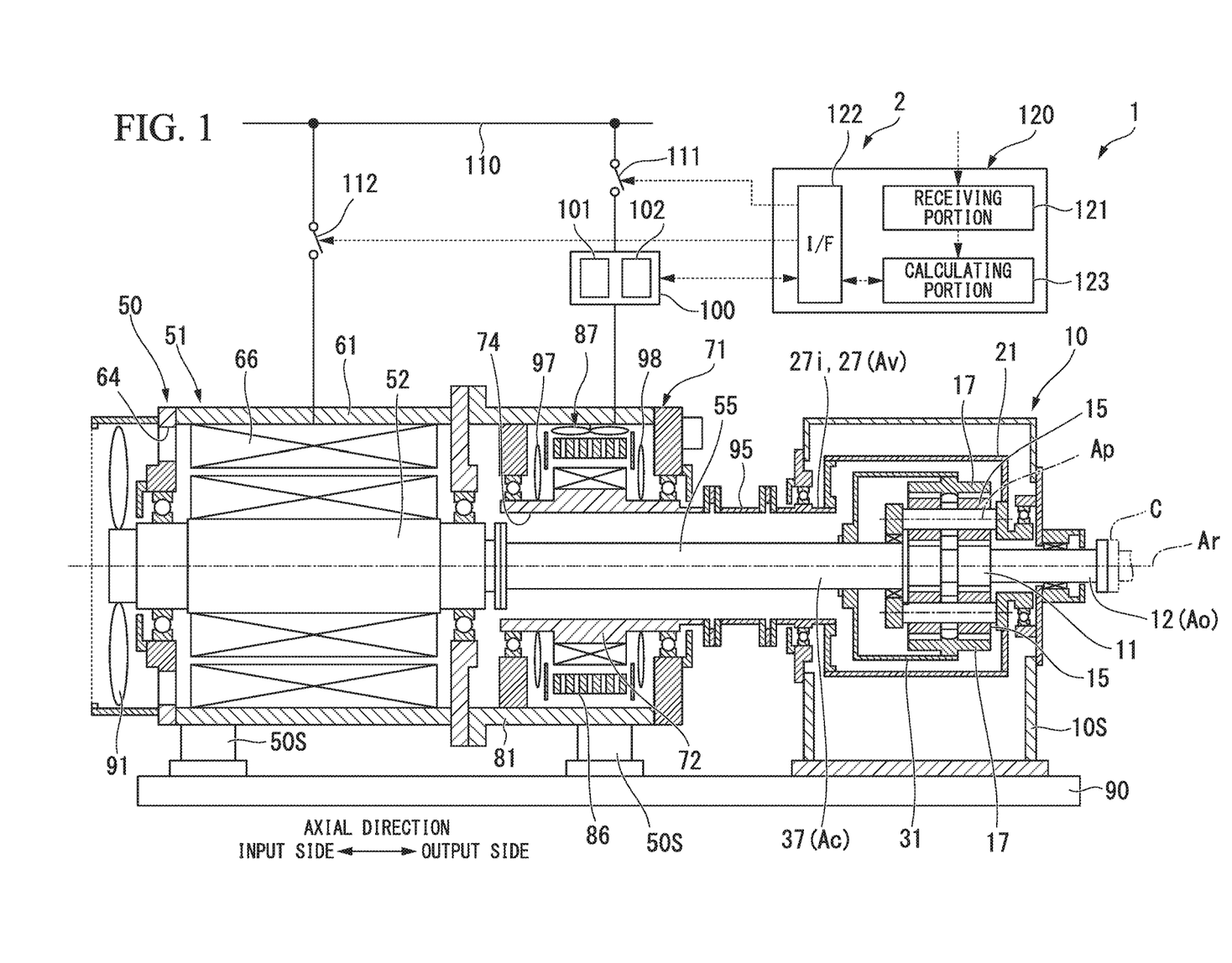
FIG. 1 is a cross-sectional view of a variable-speed speed increaser according to an embodiment of the present invention.

As shown in FIG. 1, the variable-speed speed increaser 1 of the embodiment includes an electric driving device 50 which generates a rotational driving force, and a transmission device 10 which changes the speed of a rotational driving force generated by the electric driving device 50 and then transmits the speed-changed rotational driving force to a driving target. The variable-speed speed increaser 1 can be applied to, for example, a fluid mechanical system such as a compressor system.

Figure 2:
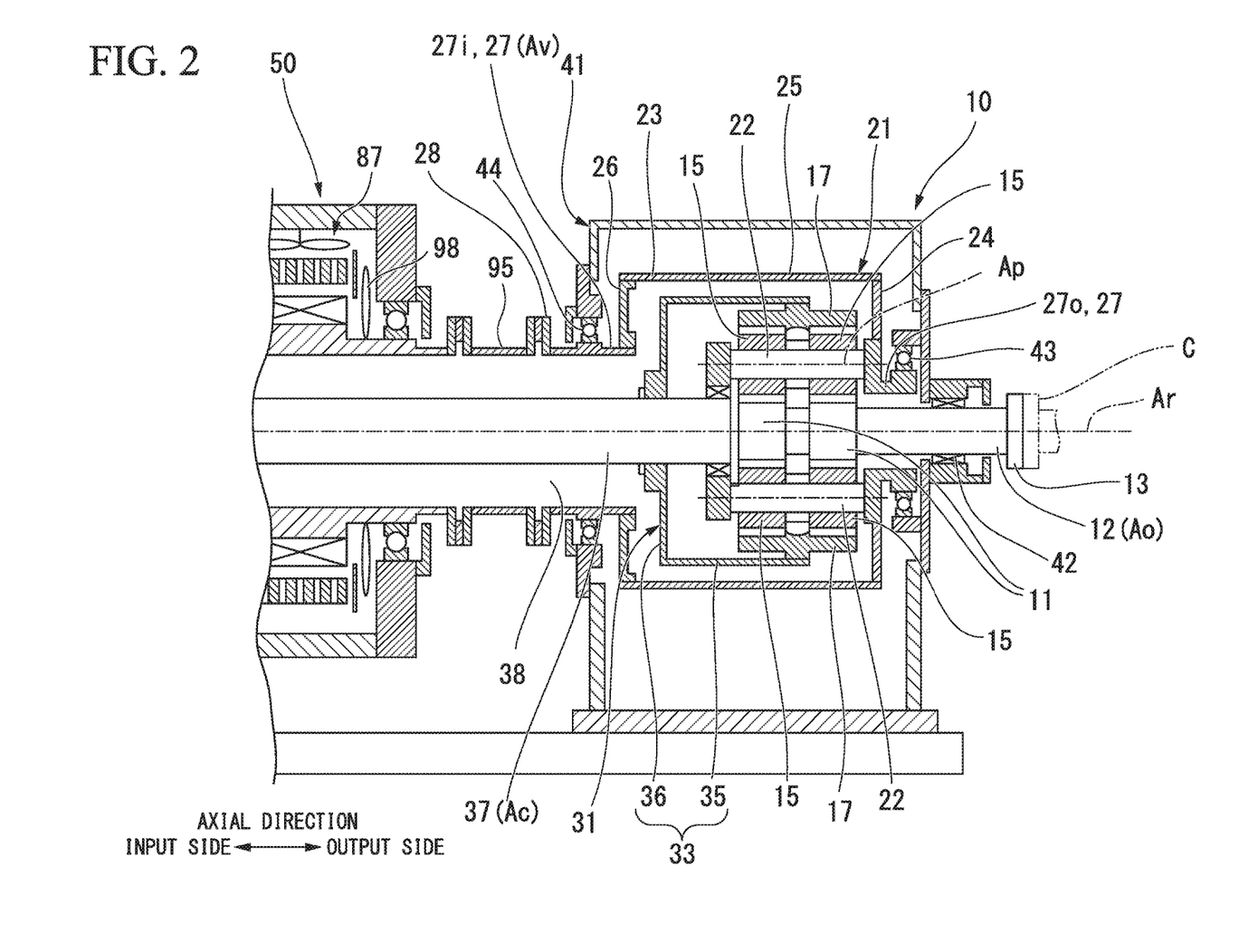
FIG. 2 is a cross-sectional view of a transmission device according to the embodiment of the present invention.

The transmission device 10 is a planetary gear transmission device. As shown in FIG. 2, the transmission device 10 includes: a sun gear 11 which rotates about an axis Ar extending in a horizontal direction; a sun gear shaft 12 fixed to the sun gear 11; a plurality of planetary gears 15 which mesh with the sun gear 11, revolve around the axis Ar and rotates about their own center lines Ap; an internal gear 17 in which a plurality of teeth are arranged in an annular shape around the axis Ar and which meshes with the plurality of planetary gears 15; a planetary gear carrier 21 which supports the plurality of planetary gears 15 to allow the plurality of planetary gears 15 to revolve around the axis Ar and to rotate about their own center lines Ap, an internal gear carrier 31 which supports the internal gear 17 to allow the internal gear 17 to rotate about the axis Ar, and a transmission casing 41 which covers these elements.

Hereinafter, a direction in which the axis Ar extends is defined as an axial direction, one side in the axial direction is defined as an output side, and a side opposite to the output side is defined as an input side. A radial direction around the axis Ar is simply referred to as a radial direction.

The sun gear shaft 12 has a circular column shape centered on the axis Ar and extends from the sun gear 11 toward the output side in the axial direction. A flange 13 is formed at an output-side end of the sun gear shaft 12. For example, a rotor of the compressor C which serves as a driving target is connected to the flange 13. The sun gear shaft 12 is supported to be rotatable about the axis Ar by a sun gear bearing 42 disposed on the output side of the sun gear 11. The sun gear bearing 42 is installed at the transmission casing 41.

The planetary gear carrier 21 includes: a planetary gear shaft 22 provided for each of the plurality of planetary gears 15; a carrier main body 23 which fixes the relative positions of the plurality of planetary gear shafts 22; and a planetary gear carrier shaft 27 which is fixed to the carrier main body 23 and extends in the axial direction centered on the axis Ar.

The planetary gear shaft 22 passes through the center lines Ap of the planetary gears 15 in the axial direction and supports the planetary gears 15 to allow the planetary gears 15 to rotate about a center line thereof. The carrier main body 23 includes: an output-side arm portion 24 extending outward in the radial direction from the plurality of planetary gear shafts 22; a cylindrical portion 25 which has a cylindrical shape centered on the axis Ar and extends from the radially outer end of the output-side arm portion 24 toward the input side; and an input-side arm portion 26 which extends inward in the radial direction from the output-side end of the cylindrical portion 25.

The planetary gear carrier shaft 27 includes: an output-side planetary gear carrier shaft 27o which extends from the output-side arm portion 24 toward the output side; and an input-side planetary gear carrier shaft 27i which extends from the input-side arm portion 26 toward the input side. Both of the output-side planetary gear carrier shaft 27o and the input-side planetary gear carrier shaft 27i form a cylindrical shape centered on the axis Ar.

The output-side planetary gear carrier shaft 27o is supported to be rotatable about the axis Ar by a planetary gear carrier bearing 43 disposed on the output side relative to the output-side arm portion 24. The planetary gear carrier bearing 43 is installed at the transmission casing 41. The sun gear shaft 12 is inserted through the inner circumferential side of the output-side planetary gear carrier shaft 27o.

The input-side planetary gear carrier shaft 27i is supported to be rotatable about the axis Ar by a planetary gear carrier bearing 44 disposed on the input side relative to the input-side arm portion 26. The planetary gear carrier bearing 44 is installed at the transmission casing 41. An annular flange 28 expanding radially outward is formed at the input-side end of the input-side planetary gear carrier shaft 27i.

The internal gear carrier 31 includes: a carrier main body 33 to which the internal gear 17 is fixed; and an internal gear carrier shaft 37 which is fixed to the carrier main body 33 and extends in the axial direction centered on the axis Ar.

The carrier main body 33 includes: a cylindrical portion 35 which has a cylindrical shape centered on the axis Ar and has the internal gear 17 fixed to the inner circumferential side thereof; and an input-side arm portion 36 which extends inward in the radial direction from the input-side end of the cylindrical portion 35.

The internal gear carrier shaft 37 having a column shape around the axis Ar is disposed on the input side of the sun gear shaft 12 having a column shape around the axis Ar. The input-side arm portion 36 of the carrier main body 33 is fixed to the internal gear carrier shaft 37. An input-side portion of the internal gear carrier shaft 37 is inserted through the inner circumferential side of the cylindrical input-side planetary gear carrier shaft 27i.

The electric driving device 50 includes: a constant-speed motor 51 which rotates the internal gear carrier shaft 37 at a constant speed; and a variable-speed motor 71 which rotates the input-side planetary gear carrier shaft 27i at an arbitrary rotation rate.

The internal gear carrier shaft 37 is a constant-speed input shaft Ac which rotates at a constant speed under a driving force of the constant-speed motor 51. The input-side planetary gear carrier shaft 27i is a variable-speed input shaft Av which rotates at an arbitrary rotation rate under a driving force of the variable-speed motor 71.

The variable-speed speed increaser 1 can change the rotation rate of an output shaft Ao of the transmission device 10 connected to the driving target by changing the rotation rate of the variable-speed motor 71.

The electric driving device 50 is supported on a frame 90 by an electric driving device support portion 50S. The transmission device 10 is supported on the frame 90 by a transmission device support portion 10S. The electric driving device 50 and the transmission device 10 which are heavy objects can be securely fixed by these support portions.

Figure 3:
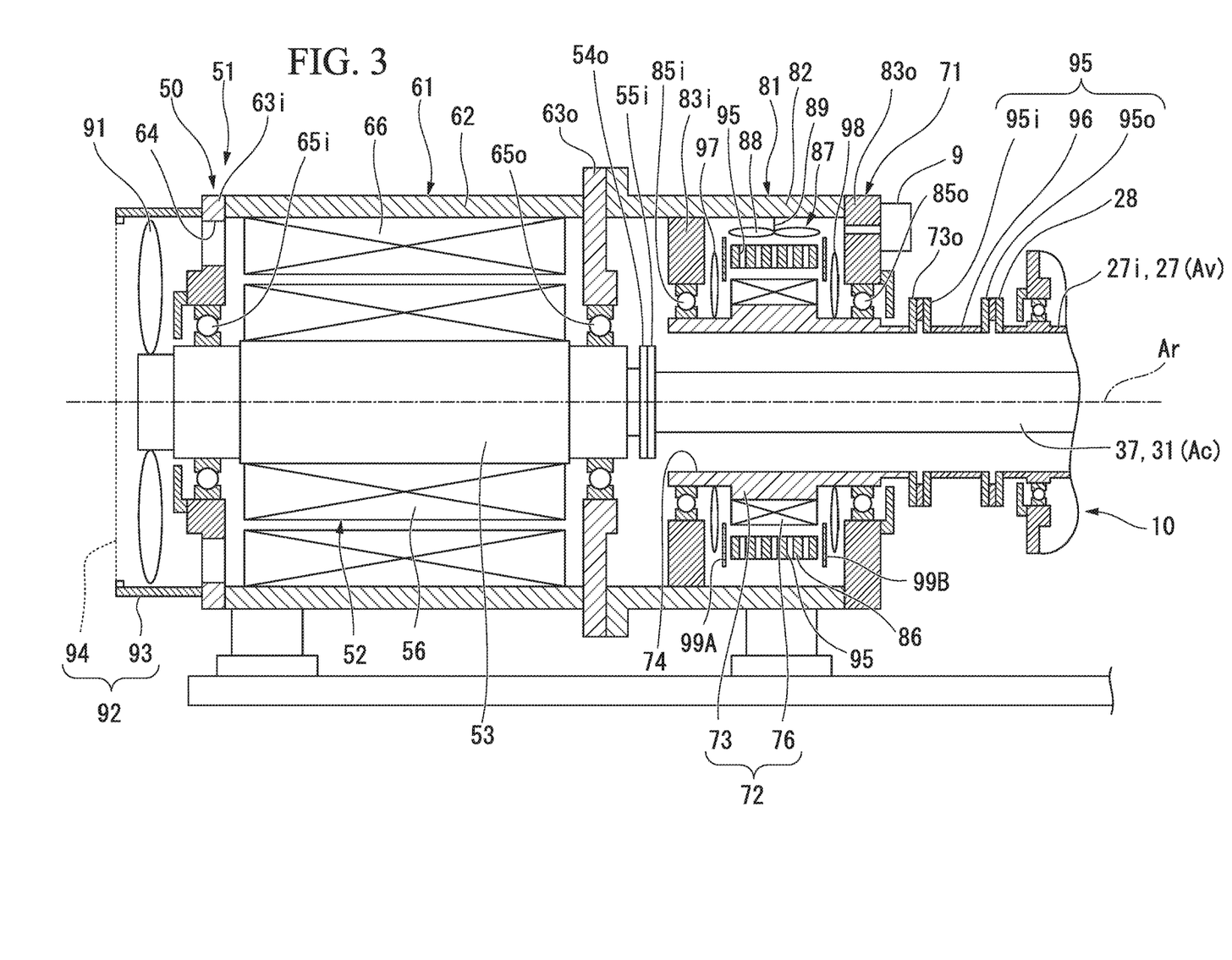
FIG. 3 is a cross-sectional view of an electric driving device according to the embodiment of the present invention.

As shown in FIG. 3, the constant-speed motor 51 rotationally drives the internal gear carrier shaft 37 of the transmission device 10. The variable-speed motor 71 rotationally drives the input-side planetary gear carrier shaft 27i of the transmission device 10. The electric driving device 50 includes: a cooling fan 91 which cools the constant-speed motor 51; and a fan cover 92 which covers the cooling fan 91.

In the embodiment, the constant-speed motor 51 is, for example, a three-phase four-pole induction motor. Further, the variable-speed motor 71 is a six-pole induction motor having more poles than the constant-speed motor 51. The specifications of the constant-speed motor 51 and the variable-speed motor 71 are not limited to these and can be appropriately changed.

The constant-speed motor 51 includes: a constant-speed rotor 52 which rotates about the axis Ar and is connected to the internal gear carrier shaft 37 which is the constant-speed input shaft Ac of the transmission device 10; a constant-speed stator 66 disposed on the outer circumferential side of the constant-speed rotor 52; and a constant-speed motor casing 61 in which the constant-speed stator 66 is fixed to the inner circumferential side thereof.

The constant-speed motor 51 rotationally drives the constant-speed rotor 52 (internal gear 17) in a first direction R1 (see FIG. 5, positive direction) of the circumferential direction of the axis Ar. The internal gear carrier shaft 37 and the internal gear carrier 31 rotate in the first direction R1 when the constant-speed rotor 52 rotates in the first direction R1.

The constant-speed rotor 52 includes: a constant-speed rotor shaft 53 which has a column shape around the axis Ar, and a conductive body 56 fixed to the outer circumference of the constant-speed rotor shaft 53. The cooling fan 91 is fixed to the input side end of the constant-speed rotor shaft 53.

The constant-speed stator 66 is disposed radially outward from the conductive body 56 of the constant-speed rotor 52. This constant-speed stator 66 is formed of a plurality of coils.

The constant-speed motor casing 61 includes: a casing main body 62 having a cylindrical shape centered on the axis Ar and in which the constant-speed stator 66 is fixed to the inner circumferential side thereof; and covers 63i and 63o which close both axial ends of the cylindrical casing main body 62. Constant-speed rotor bearings 65i and 65o are installed at the respective covers 63i and 63o to rotatably support the constant-speed rotor shaft 53 about the axis Ar. A plurality of openings 64 axially passing through the cover 63i at positions radially outward from the constant-speed rotor bearing 65i are formed in the cover 63i on the input side.

The input-side end of the constant-speed rotor shaft 53 protrudes toward the input side from the input-side cover 63i of the constant-speed motor casing 61. The cooling fan 91 is fixed to the input-side end of the constant-speed rotor shaft 53.

When the constant-speed rotor 52 rotates, the cooling fan 91 also rotates integrally with the constant-speed rotor 52. The fan cover 92 includes: a cylindrical cover main body 93 disposed on the outer circumferential side of the cooling fan 91; and an air circulating plate 94 installed at an opening of the cover main body 93 on the inlet side and having a plurality of air holes formed therein. The fan cover 92 is fixed to the cover 63i of the constant-speed motor casing 61 on the input side.

The variable-speed motor 71 includes: a variable-speed rotor 72 which rotates about the axis Ar and is connected to the input-side planetary gear carrier shaft 27i which is the variable-speed input shaft Av; a variable-speed stator 86 disposed on the outer circumferential side of the variable-speed rotor 72; and a variable-speed motor casing 81 in which the variable-speed stator 86 is fixed to the inner circumferential side thereof.

The variable-speed motor 71 is configured to rotationally drive the variable-speed rotor 72 (planetary gear carrier 21) in the first direction R1 of the circumferential direction of the axis Ar and a second direction R2 (refer to FIG. 5) opposite to the first direction R1. That is, the variable-speed motor 71 can rotate forward and in reverse.

The variable-speed motor 71 serves as a generator by rotating the variable-speed rotor 72 in the first direction R1. A state in which the variable-speed motor 71 serves as a generator is referred to as a generator mode. That is, the variable-speed rotor 72 of the variable-speed motor 71 rotates in the first direction R1 in the generator mode.

The variable-speed motor 71 serves as an electric motor by rotating the variable-speed rotor 72 in the second direction R2 opposite to the first direction R1. A state in which the variable-speed motor 71 serves as an electric motor is referred to as an electric motor mode. That is, the variable-speed rotor 72 of the variable-speed motor 71 rotates in the second direction R2 in the electric motor mode.

The planetary gear carrier shaft 27 and the planetary gear carrier 21 rotate in the first direction R1 when the variable-speed rotor 72 rotates in the first direction R1.

The variable-speed rotor 72 includes: a variable-speed rotor shaft 73; and a conductive body 76 fixed to the outer circumference of the variable-speed rotor shaft 73. The variable-speed rotor shaft 73 has a shaft insertion hole 74 formed a cylindrical shape centered on the axis Ar and passing through the variable-speed rotor shaft 73 in the axial direction. The internal gear carrier shaft 37 is inserted through the shaft insertion hole 74 of the variable-speed rotor shaft 73 as the constant-speed input shaft Ac. An annular flange 73o expanding outward in the axial direction is formed at the output-side end of the variable-speed rotor shaft 73.

The variable-speed stator 86 is disposed radially outward from the conductive body 76 of the variable-speed rotor 72. The variable-speed stator 86 is formed of a plurality of coils. A plurality of cooling holes 95 passing through the variable-speed stator 86 in the radial direction are formed in the variable-speed stator 86.

The variable-speed motor casing 81 includes: a casing main body 82 having a cylindrical shape around the axis Ar and to the inner circumferential side of which the variable-speed stator 86 is fixed; an output-side cover 83o which closes the output-side end of the cylindrical casing main body 82; and an inlet-side cover 83i disposed on the input side relative to the variable-speed stator 86, and fixed to the inner circumferential side of the cylindrical casing main body 82. Variable-speed rotor bearings 85i and 85o which support the variable-speed rotor shaft 73 to be rotatable about the axis Ar are installed at the respective covers 83i and 83o.

The variable-speed motor casing 81 has an airtight structure by the casing main body 82 and the covers 83i and 83o.

Further, in the variable-speed speed increaser 1 of the embodiment, the constant-speed rotor 52, the variable-speed rotor 72 and the sun gear shaft 12 are disposed on the same axis.

The variable-speed motor 71 according to the embodiment includes an electric cooling fan 87 (blower) which mainly cools the conductive body 76 and the variable-speed stator 86. The electric cooling fan 87 is installed on the inner circumferential surface of the casing main body 82 of the variable-speed motor 71. The position of the electric cooling fan 87 in the axial direction Ar is the same as the center position of the conductive body 76 and the variable-speed stator 86.

The electric cooling fan 87 has an impeller 88 which rotates under electric power supplied from a power source line 110. A rotational center axis 89 of the impeller 88 of the electric cooling fan 87 is oriented to intersect the axis Ar. That is, a direction of wind generated by the electric cooling fan 87 is the radial direction.

Since a plurality of cooling holes 95 are formed in the variable-speed stator 86, the wind generated by the electric cooling fan 87 can cool not only the variable-speed stator 86 but also the conductive body 76.

The electric cooling fan 87 can switch the direction of the wind between a direction toward an inner side in the radial direction and a direction toward an outer side in the radial direction by changing the rotation direction of the impeller 88.

A first impeller 97 and a second impeller 98 are installed at the variable-speed rotor shaft 73 of the variable-speed motor 71 of the embodiment. The first impeller 97 and the second impeller 98 are axial flow fans having pluralities of blades. The pluralities of blades are installed on the outer circumferential surface of the variable-speed rotor shaft 73 at regular intervals in the circumferential direction.

When the variable-speed rotor 72 rotates, the first impeller 97 and the second impeller 98 also rotate integrally with the variable-speed rotor 72.

The first impeller 97 is disposed between an input-side variable-speed rotor bearing 85i and the conductive body 76 in the axial direction. The second impeller 98 is disposed between an output-side variable-speed rotor bearing 85o and the conductive body 76 in the axial direction.

The first impeller 97 and the second impeller 98 are formed so that the directions of the wind in the axial direction are opposite to each other. When the variable-speed rotor 72 is rotated in one direction, the direction of the wind generated by the first impeller 97 and the direction of the wind generated by the second impeller 98 are opposite to each other in the axial direction.

The first impeller 97 and the second impeller 98 of the embodiment are formed such that the direction of the generated wind is directed to the conductive body 76 when the variable-speed rotor 72 rotates in the second direction R2. That is, when the variable-speed rotor 72 rotates in the electric motor mode, the wind generated by the first impeller 97 flows toward the output side and the wind generated by the second impeller 98 flows toward the input side.

A first rectifying plate 99A extending in the circumferential direction is disposed between the first impeller 97 and the conductive body 76 in the axial direction. A main surface of the first rectifying plate 99A is a circular plate which is orthogonal to the axis Ar and through which the variable-speed rotor 72 is inserted at a center portion thereof.

A predetermined gap extending in the circumferential direction is formed between the outer circumferential end of the first rectifying plate 99A and the inner circumferential surface of the casing main body 82. A predetermined gap extending in the circumferential direction is formed between the first rectifying plate 99A and the variable-speed rotor shaft 73. The first rectifying plate 99A is fixed to the casing main body 82 by a plurality of stays (not shown).

A second rectifying plate 99B having the same shape as that of the first rectifying plate 99A is disposed between the second impeller 98 and the conductive body 76 in the axial direction.

The variable-speed speed increaser 1 of the embodiment includes: a gas supply device 9 which supplies a gas such as air to an internal space of the variable-speed motor casing 81. The gas supply device 9 has an ability to increase an air pressure in the internal space of the variable-speed motor casing 81. The gas supplied by the gas supply device 9 is introduced into the internal space of the variable-speed motor casing 81 via a gas supply hole 9A.

As the gas supply device 9, a predetermined air purge unit may be used.

The variable-speed speed increaser 1 of the embodiment includes: a rotation rate controller 100 which controls the rotation rate of the variable-speed motor 71; a first switch 111 which sets the variable-speed motor 71 to be in a power supply state or a power cutoff state; a second switch 112 which sets the constant-speed motor 51 to be in the power supply state or the power cutoff state; and a controller 120 which controls operations of the rotation rate controller 100, the first switch 111 and the second switch 112.

The controller 120 is constituted with a computer. The controller 120 includes: a receiving portion 121 which directly receives an instruction from an operator or receives an instruction from a host control device; an interface 122 which provides instructions to the first switch 111, the rotation rate controller 100 and the second switch 112; and a calculating portion 123 which creates instructions for the first switch 111, the second switch 112 and the rotation rate controller 100 according to the instructions received by the receiving portion 121 or the like.

The first switch 111 is electrically connected to a power source line 110 and the rotation rate controller 100. The rotation rate controller 100 is electrically connected to the variable-speed motor 71. The second switch 112 is electrically connected to the power source line 110 and the constant-speed motor 51.

The first switch 111 is turned on by an ON instruction from the controller 120 and turned off by an OFF instruction from the controller 120. When the first switch 111 is turned on, electric power from the power source line 110 is supplied to the variable-speed motor 71 through the rotation rate controller 100, and the variable-speed motor 71 is in the power supply state. When the first switch 111 is turned off, the power supply from the power source line 110 to the rotation rate controller 100 and the variable-speed motor 71 is cut off, and the variable-speed motor 71 is in the power cutoff state.

The second switch 112 is turned on by an ON instruction from the controller 120 and turned off by an OFF instruction from the controller 120. When the second switch 112 is turned on, the electric power from the power source line 110 is supplied to the constant-speed motor 51, and the constant-speed motor 51 is in the power supply state. When the second switch 112 is turned off, the power supply from the power source line 110 to the constant-speed motor 51 is cut off, and the constant-speed motor 51 is in the power cutoff state.

The rotation rate controller 100 includes: a frequency conversion portion 101 which changes a frequency of the electric power supplied from the power source line 110; and a rotation direction switching portion 102 which changes a rotation direction of the variable-speed motor 71.

The frequency conversion portion 101 supplies the electric power having a frequency instructed from the controller 120 to the variable-speed motor 71. The variable-speed rotor 72 of the variable-speed motor 71 rotates at a rotation rate corresponding to this frequency. Thus, the rotation rate of the variable-speed rotor 72 changes in this manner, and thereby the rotation rate of the planetary gear carrier 21 of the transmission device 10 connected to the variable-speed rotor 72 also changes. As a result, the rotation rate of the sun gear shaft 12 which is the output shaft Ao of the transmission device 10 also changes.

The rotation direction switching portion 102 is a device which changes the rotation direction of the variable-speed motor 71 by using a circuit configured to switch a plurality of (three in the case of the embodiment) power source lines connected to the variable-speed motor 71. That is, the rotation direction switching portion 102 can rotate the variable-speed rotor 72 forward and in reverse.

Figure 4:
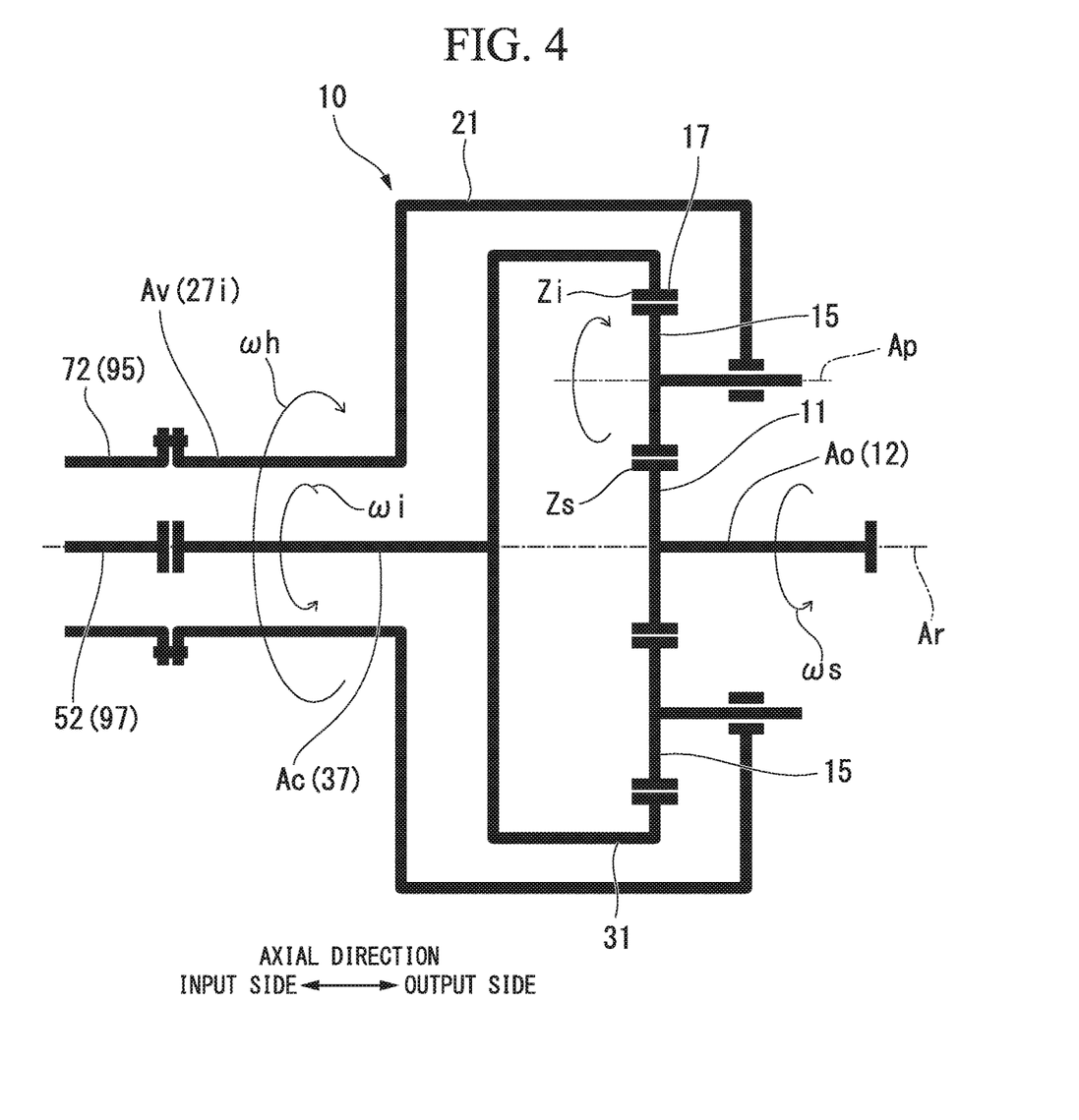
FIG. 4 is a schematic diagram showing the constitution of the transmission device according to the embodiment of the present invention.

Here, the relationship between the number of teeth of each gear of the transmission device 10 and the rotation rate of each shaft of the transmission device 10 will be described with reference to FIG. 4.

The rotation rate of the sun gear shaft 12 that is the output shaft Ao is indicated by $\omega s$, the rotation rate of the internal gear carrier shaft 37 that is the constant-speed input shaft Ac is indicated by $\omega i$, and the rotation rate of the input-side planetary gear carrier shaft 27$i$ that is the variable-speed input shaft Av is indicated by $\omega h$. Further, the number of teeth of the sun gear 11 is indicated by Zs, and the number of teeth of the internal gear 17 is indicated by Zi.

In this case, the relationship between the number of teeth of each gear and the rotation rate of each shaft in the transmission device 10 can be expressed by the following Formula (1):

$$\omega s/\omega i = \omega h/\omega i - (1-\omega h/\omega i) \times Zi/Zs \qquad (1)$$

When the constant-speed motor 51 is a four-pole induction motor and the power source frequency is 50 Hz, the rotation rate $\omega i$ (rated rotation rate) of the constant-speed rotor 52 (constant-speed input shaft Ac) is 1,500 rpm. Further, when the variable-speed motor 71 is a six-pole induction motor and the power supply frequency is 50 Hz, the maximum rotation rate $\omega h$ (rated rotation rate) of the variable-speed rotor 72 (variable-speed input shaft Av) is 900 rpm. Furthermore, it is simulated that a ratio Zi/Zs between the number of teeth Zs of the sun gear 11 and the number of teeth Zi of the internal gear 17 is 4.

In this case, when the rotation direction of the constant-speed rotor 52 (internal gear 17) is the forward rotation (rotation in the first direction) and the rotation direction of the variable-speed rotor 72 (planetary gear carrier 21) is a direction opposite to the rotation of the constant-speed rotor 52 (rotation in the second direction) and the variable-speed rotor 72 has the maximum rotation rate (−900 rpm), the rotation rate os of the sun gear shaft 12 which is the output shaft Ao is −10,500 rpm. This rotation rate (−10,500 rpm) is the maximum rotation rate of the sun gear shaft 12.

That is, in the transmission device 10 of the embodiment, the rotation rate $\omega s$ of the output shaft Ao becomes the maximum rotation rate when the internal gear 17 rotates in accordance with the constant-speed input shaft Ac at +1500 rpm in the forward direction and the planetary gear carrier 21 rotates in accordance with the variable-speed input shaft Av at −900 rpm in the reverse direction.

Assuming that a variable-speed range of the variable-speed input shaft Av is from −900 rpm to +900 rpm, the rotation rate $\omega s$ of the output shaft Ao lowers as the rotation rate of the variable-speed input shaft Av approaches +900 rpm.

When the rotation direction of the constant-speed rotor 52 is the forward rotation and the rotation direction of the variable-speed rotor 72 is the direction opposite to the rotation direction of the constant-speed rotor 52 and the variable-speed rotor 72 has the minimum rotation rate (−90 rpm), the rotation rate of the sun gear shaft 12 is −6450 rpm.

When the rotation rate (rated rotation rate) of the constant-speed rotor 52 is +1500 rpm and the rotation rate of the variable-speed rotor 72 in the electric motor mode is controlled within a range of −300 to −900 rpm by frequency control of the frequency conversion portion 101, in other words, when the frequency of the electric power supplied to the variable-speed motor 71 is controlled within a range of 16.7 Hz to 50 Hz, the rotation rate of the sun gear shaft 12 which is the output shaft Ao can be controlled within a range of −7500 to −10500 rpm. This range is a variable speed range of the sun gear shaft 12 which is the output shaft Ao of the variable-speed speed increaser, and the variable-speed speed increaser 1 normally rotates the output shaft Ao within this variable speed range.

Figure 5:
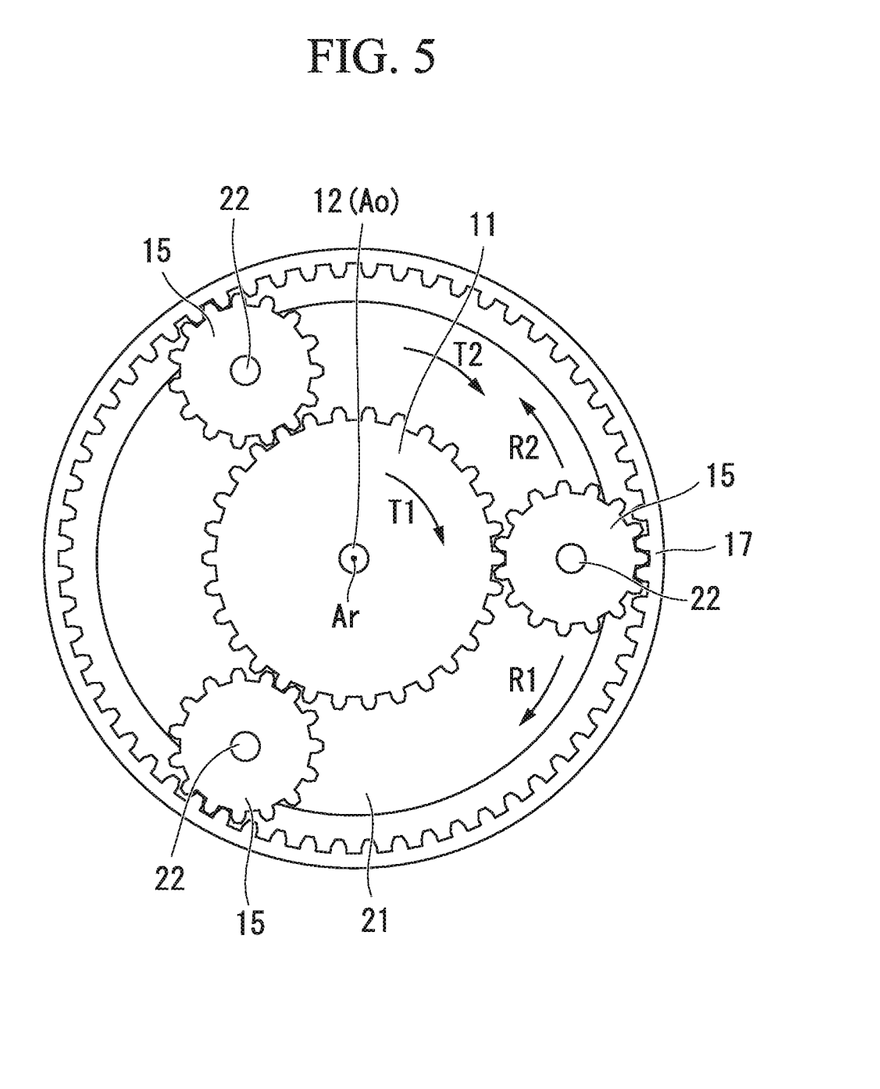
FIG. 5 is a view of the transmission device according to the embodiment of the present invention when seen from an input side in an axial direction and is a schematic view showing a rotation direction of a gear constituting the transmission device.

Next, the rotation direction and torque of the gear in the transmission device 10 of the variable-speed speed increaser 1 of the embodiment will be described in detail. As shown in FIG. 5, during an operation of the variable-speed speed increaser 1, the internal gear 17 is rotated in the first direction R1 by the constant-speed motor 51. The planetary gear carrier 21 is rotated in the first direction R1 or the second direction R2 by the variable-speed motor 71.

In the variable-speed speed increaser 1 of the embodiment, a rotation direction and a torque direction of the sun gear shaft 12 which is the output shaft Ao are the second direction R2 in view of a variable speed range of the variable-speed input shaft Av.

A control device (not shown) of the variable-speed speed increaser 1 of the present invention is configured to control the rotation direction of the electric cooling fan 87 according to the rotation direction of the variable-speed rotor 72. When the variable-speed rotor 72 in the electric motor mode is rotating in the second direction R2, the control device controls the electric cooling fan 87 so that the direction of the wind generated by the electric cooling fan 87 is directed outward in the radial direction.

Figure 6:
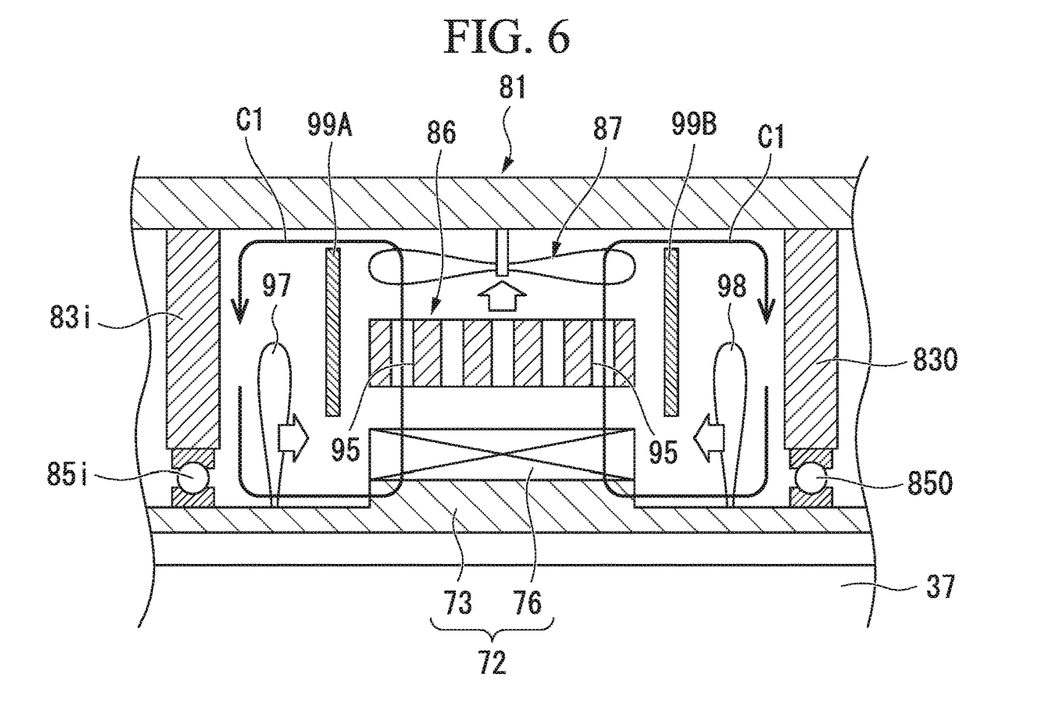
FIG. 6 is a schematic diagram showing a flow of wind during an operation of the variable-speed speed increaser according to the embodiment of the present invention.

Further, in the electric motor mode, since the wind generated by the first impeller 97 and the second impeller 98 is directed from the impellers 97 and 98 to the conductive body 76 as described above, the wind flows as shown in FIG. 6. That is, a circulating flow C1 is formed by the first impeller 97, the second impeller 98 and the electric cooling fan 87. The electric cooling fan 87 strengthens the circulating flow C1 and reduces windage loss caused by rotation of the first impeller 97 and the second impeller 98.

Figure 7:
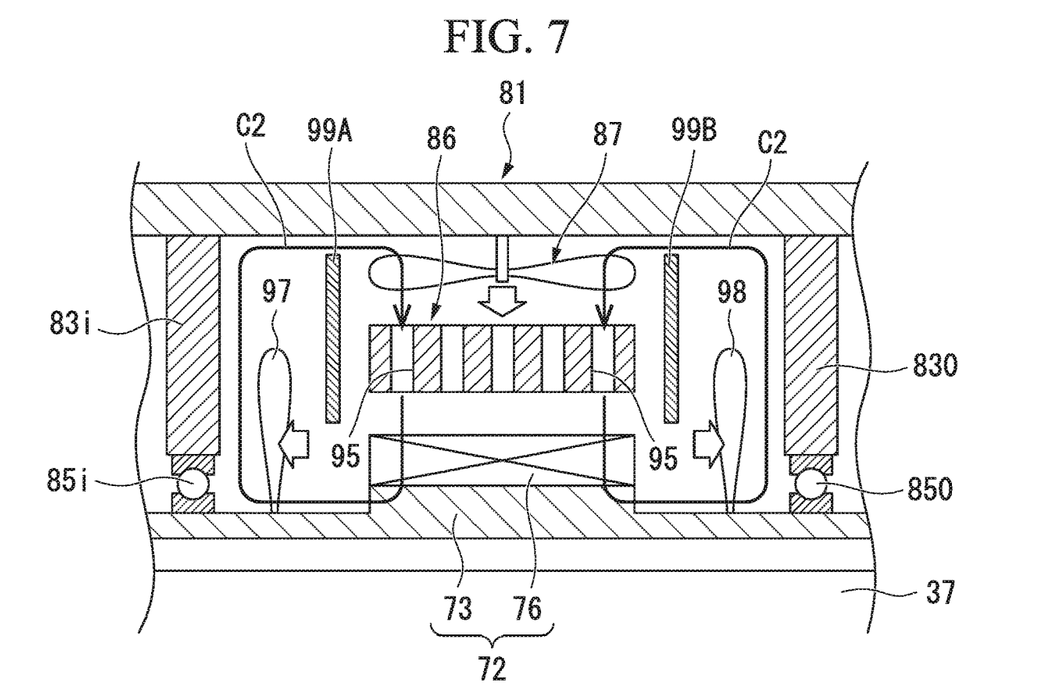
FIG. 7 is a schematic diagram showing the flow of wind during the operation of the variable-speed speed increaser according to the embodiment of the present invention.

When the variable-speed rotor 72 is rotating in the first direction R1, the control device controls the electric cooling fan 87 so that the direction of the wind generated by the electric cooling fan 87 is directed radially inward. Thus, the wind flows as shown in FIG. 7. That is, a circulating flow C2 is formed by the first impeller 97, the second impeller 98 and the electric cooling fan 87. The electric cooling fan 87 strengthens the circulating flow C2 and reduces the windage loss caused by the rotation of the first impeller 97 and the second impeller 98.

Next, an emergency stopping method of the variable-speed speed increaser 1 of the embodiment will be described. The emergency stop of the variable-speed speed increaser 1 includes an emergency stop of the constant-speed motor 51 and the variable-speed motor 71 due to a failure of the rotation rate controller 100 (inverter), and an emergency stop of the constant-speed motor 51 and the variable-speed motor 71 due to a failure of power supply.

A control device (not shown) of the variable-speed speed increaser 1 of the present invention is configured to determine whether or not to perform emergency stop of the variable-speed speed increaser 1. For example, when a malfunction of the rotation rate controller 100 is detected, the control device performs an emergency stop of the variable-speed speed increaser 1.

At this time, the control device turns off the first switch 111 and the second switch 112. Therefore, the rotation rate of the constant-speed motor 51 gradually decreases. The rotation rate of the output shaft Ao is reduced by a load of the gas inside the compressor C.

Next, a torque T1 in the first direction R1 is generated in the sun gear 11 connected to the output shaft Ao (refer to FIG. 5).

Therefore, a torque T2 in the first direction R1 is generated in the variable-speed rotor 72 via the planetary gear 15 and the planetary gear carrier 21. That is, the torque T2 which rotates the variable-speed rotor 72 in the second direction R2 is generated by the torque T1 generated by the compressor C with the emergency stop of the electric driving device 50.

As the first switch 111 and the second switch 112 are turned off, the control device supplies air to the internal space of the variable-speed motor casing 81 using the gas supply device 9.

According to the embodiment, since the first impeller 97 and the second impeller 98 are provided on the variable-speed rotor 72, the first impeller 97 and the second impeller 98 become resistance against the rotation of the variable-speed rotor 72 at the time of emergency stop of the variable-speed speed increaser 1. That is, the windage loss due to the first impeller 97 and the second impeller 98 prevents the variable-speed motor 71 from over-rotating.

Further, since the first impeller 97 and the second impeller 98 are provided inside the variable-speed motor casing 81, the inside of the variable-speed motor 71 can be cooled using the impellers 97 and 98 during the operation of the variable-speed speed increaser 1.

Further, the windage loss due to the impellers 97 and 98 can be increased by introducing the gas into the internal space of the variable-speed motor casing 81 and increasing the pressure in the internal space when emergency stop of the variable-speed speed increaser 1 is performed.

Further, it is possible to reduce the windage loss caused by the impellers 97 and 98 during the operation of the variable-speed speed increaser 1 by operating the electric cooling fan 87 to reduce the windage loss caused by the impellers 97 and 98 during the operation of the variable-speed speed increaser 1.

Next, the variable-speed speed increaser 1 according to a modified example of the embodiment will be described.

The first impeller 97 and the second impeller 98 of the variable-speed speed increaser 1 of the modified example are configured to allow an angle of blades to be changed. The angle of the blades can be changed, for example, using electric power of a reserve battery.

At the time of emergency stop of the variable-speed speed increaser 1, the control device changes the angle of the blades to increase the windage loss.

According to the modified example, the resistance by the first impeller 97 and the second impeller 98 can be made larger during the emergency stop of the variable-speed speed increaser 1.

Although an embodiment of the present invention has been described in detail, various modifications can be made without departing from the technical idea of the present invention.

For example, in the above embodiment, the impellers 97 and 98 are disposed in the internal space of the variable-speed motor casing 81, but in the case in which the internal space is limited, the impellers 97 and 98 may be disposed outside the variable-speed motor casing 81.

DESCRIPTION OF REFERENCE NUMERALS

1 Variable-speed speed increaser
9 Gas supply device
10 Transmission device
11 Sun gear
12 Sun gear shaft
15 Planetary gear
17 Internal gear
21 Planetary gear carrier
22 Planetary gear shaft
27 Planetary gear carrier shaft
31 Internal gear carrier
37 Internal gear carrier shaft
41 Transmission casing
50 Electric driving device
51 Constant-speed motor
52 Constant-speed rotor
53 Constant-speed rotor shaft
56 Conductive body
61 Constant-speed motor casing
66 Constant-speed stator
71 Variable-speed motor
72 Variable-speed rotor
73 Variable-speed rotor shaft
76 Conductive body
81 Variable-speed motor casing 82 Casing main body
86 Variable-speed stator
87 Electric cooling fan (blower)
88 Impeller
89 Rotational center axis
91 Cooling fan
95 Cooling hole
97 First impeller
98 Second impeller
99A First rectifying plate
99B Second rectifying plate
100 Rotation rate controller
110 Power source line
120 Controller
Ac Constant-speed input shaft
Ao Output shaft
Ar Axis
Av Variable-speed input shaft
C Compressor

The invention claimed is:

1. A variable-speed speed increaser comprising:
an electric driver which is configured to generate a rotational driving force; and
a transmitter which is configured to change the speed of the rotational driving force generated by the electric driver and transmit the changed rotation driving force to a driving target,
wherein the transmitter comprises:
  a sun gear which is configured to rotate about an axis;
  a sun gear shaft which is fixed to the sun gear and extends in an axial direction around the axis;
  a planetary gear which is configured to mesh with the sun gear, revolve around the axis and rotate about a center line of the planetary gear;
  an internal gear which comprises a plurality of teeth aligned annularly around the axis and is configured to mesh with the planetary gear;
  a planetary gear carrier which has a planetary gear carrier shaft extending in the axial direction around the axis and is configured to support the planetary gear to allow the planetary gear to revolve around the axis and to rotate about a center line of the planetary gear; and
  an internal gear carrier which comprises an internal gear carrier shaft extending in the axial direction around the axis and is configured to support the internal gear to allow the internal gear to be rotatable about the axis,
wherein the sun gear shaft forms an output shaft connected to the driving target, the internal gear carrier shaft forms a constant-speed input shaft, and the planetary gear carrier shaft forms a variable-speed input shaft, and
the electric driver comprises:
  a variable-speed motor having a variable-speed rotor which is connected to the variable-speed input shaft of the transmitter and formed in a cylindrical shape centered on the axis with a shaft insertion hole passing therethrough in the axial direction;
  a constant-speed motor having a constant-speed rotor which is connected to the constant-speed input shaft of the transmitter and inserted through the shaft insertion hole; and
  first and second impellers that are installed on the variable-speed rotor such that the first impeller is provided on one side of a conductive body of the variable-speed motor in the axial direction and the second impeller is provided on the other side of the conductive body,
wherein the first and second impellers are formed so that directions of generated wind are opposite to each other in the axial direction while rotating the variable-speed rotor in a predetermined direction and cause windage loss with respect to each other by rotation of the variable-speed rotor in the predetermined direction.

2. The variable-speed speed increaser according to claim 1, wherein the variable-speed motor comprises a variable-speed motor casing which is configured to rotatably support the variable-speed rotor, and the first and second impellers are disposed inside the variable-speed motor casing.

3. The variable-speed speed increaser according to claim 2, further comprising a gas supplier which is configured to introduce a gas into an internal space of the variable-speed motor casing.

4. The variable-speed speed increaser according to claim 1, further comprising a blower provided at the same position as the conductive body of the variable-speed motor in the axial direction and oriented so that generated wind is directed in the radial direction of the variable-speed rotor.

5. The variable-speed speed increaser according to claim 2, further comprising a blower provided at the same position as the conductive body of the variable-speed motor in the axial direction and oriented so that generated wind is directed in the radial direction of the variable-speed rotor.

6. The variable-speed speed increaser according to claim 3, further comprising a blower provided at the same position as the conductive body of the variable-speed motor in the axial direction and oriented so that generated wind is directed in the radial direction of the variable-speed rotor.

* * * * *